(12) United States Patent
Giger et al.

(10) Patent No.: US 10,352,615 B2
(45) Date of Patent: Jul. 16, 2019

(54) VACUUM COOLING DEVICE AND METHOD FOR THE VACUUM COOLING OF FOODSTUFF

(71) Applicants: Ulrich Giger, Bubikon (CH); Florian Bäbler, Mollis (CH); Kaspar Bäbler, Mollis (CH)

(72) Inventors: Ulrich Giger, Bubikon (CH); Florian Bäbler, Mollis (CH); Kaspar Bäbler, Mollis (CH)

( * ) Notice: Subject to any disclaimer, the term of this patent is extended or adjusted under 35 U.S.C. 154(b) by 367 days.

(21) Appl. No.: 15/340,332

(22) Filed: Nov. 1, 2016

(65) Prior Publication Data

US 2017/0122657 A1    May 4, 2017

(30) Foreign Application Priority Data

Nov. 4, 2015    (CH) ...................................... 1600/15

(51) Int. Cl.
| | |
|---|---|
| *A23L 3/36* | (2006.01) |
| *F25D 31/00* | (2006.01) |
| *F25D 21/14* | (2006.01) |
| *A23L 3/3418* | (2006.01) |

(52) U.S. Cl.
CPC ............ *F25D 31/00* (2013.01); *A23L 3/3418* (2013.01); *A23L 3/36* (2013.01); *A23L 3/363* (2013.01); *F25D 21/14* (2013.01); *A23V 2002/00* (2013.01)

(58) Field of Classification Search
CPC ........ F25D 31/00; F25D 21/14; A23L 3/3418; A23L 3/36; A23L 3/363; A23V 2002/00
See application file for complete search history.

(56) References Cited

U.S. PATENT DOCUMENTS

| | | | |
|---|---|---|---|
| 2,696,775 A | 12/1954 | Dean | |
| 2013/0032298 A1* | 2/2013 | Putt | B01D 5/0051 |
| | | | 159/23 |
| 2015/0037483 A1 | 2/2015 | Giger et al. | |
| 2015/0157030 A1 | 6/2015 | Giger et al. | |

FOREIGN PATENT DOCUMENTS

| | | |
|---|---|---|
| EP | 2832241 | 4/2015 |
| EP | 2881688 A1 | 6/2015 |
| GB | 259626 A | 10/1926 |
| JP | 11211314 A | 8/1999 |
| JP | 2001221546 A | 8/2001 |
| WO | 2012/082060 A1 | 6/2012 |

* cited by examiner

*Primary Examiner* — Ana M Vazquez

(74) *Attorney, Agent, or Firm* — Smith, Gambrell & Russell, LLP

(57) ABSTRACT

A vacuum cooling device for the cooling of foodstuff, in particular hot bakery products has a vacuum chamber, which contains a product chamber for receiving the foodstuff for its cooling and a separation chamber, a vacuum source, which is connected with the product chamber or the separation chamber and a vapor condenser for condensation of vapor containing discharge air generated during the cooling process in the product chamber. The vapor condenser is arranged below the product chamber, whereby the vapor condenser can contain a cooling medium, if the vacuum cooling device is in the operating state. The vapor condenser comprises a cooling medium distribution device to distribute the cooling medium in the vapor condenser. The product chamber has at least an opening for supplying the vapor containing discharge air into the cooling medium.

14 Claims, 7 Drawing Sheets

VACUUM COOLING DEVICE AND METHOD FOR THE VACUUM COOLING OF FOODSTUFF

Figure 1:
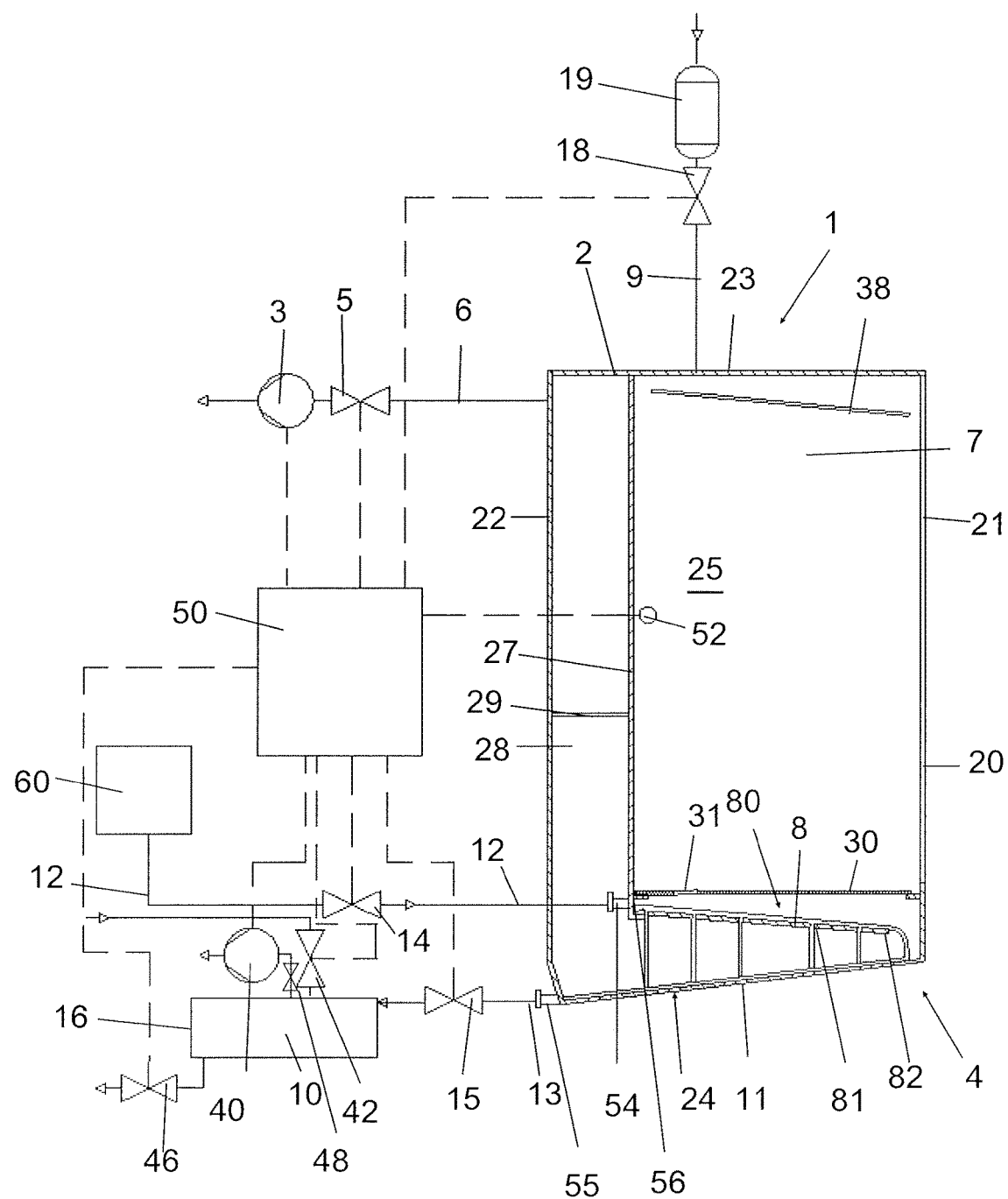

The invention relates to a vacuum cooling device and a method for the vacuum cooling of foodstuff, in particular for bakery products. In particular, the invention relates to a vacuum cooling device and a method for condensation of a vapor from a vapor containing discharge air stream of the vacuum chamber. A vacuum cooling device for foodstuff, in particular for bakery products, for example freshly baked bread under a negative pressure comprises a vacuum chamber, which is configured for receiving the foodstuff for the purpose of cooling; a vacuum source, for example a vacuum pump, which is connected with the vacuum chamber to generate a negative pressure in the vacuum chamber and a vapor condenser.

A vacuum chamber for the storage of foodstuff or wood is known for instance from GB259626A. The foodstuff can also be conserved in this vacuum chamber. For this reason, a supply conduit is provided for an inert gas, ozone or other aseptic gas for eliminating germs in the foodstuff. Two vacuum conduits, which are connected to a vacuum pump, lead into the chamber which is not shown, and which are closeable by a closing valve.

An upstanding condenser element is attached to each of the vacuum conduits in the vacuum chamber. The two condenser elements are used to absorb moisture which is released by a vapor containing tube bundle exposed of a heating element arranged below the foodstuff. The moisture condenses on the walls of the corresponding condenser elements and is discharged through the vacuum conduits by the vacuum pump. The foodstuff is dried in the vacuum chamber by the discharge of the condensate. The device is not suitable for foodstuffs which require a certain moisture content during processing, such as for instance a hot bakery product due to the fact that the vapor can not anymore be used for maintaining the moisture content due to the drying effect.

Hot and humid foodstuff can be cooled very efficiently in a vacuum chamber, that means, only a short period for cooling is required. However, during the evacuation process, a very large volume of vapor is generated, which can amount to more than one chamber volume. In a vacuum chamber, which has a chamber volume of 4 m$^3$ up to and including 6.6 m$^3$ the vapor volume can amount up to be a hundredfold of the chamber volume.

The capacity of the vacuum pump is determined by the vapor volume. That means, the vacuum pump has to be configured such that the entire vapor volume leaves the vacuum chamber via the vacuum pump. An example for a vacuum pump 1 for a vacuum cooling chamber 2 is shown in the document JP11-211314. The vacuum pump 1 is designed according to the principle of a venturi pump, which sucks the air from the vacuum cooling chamber by the water pressure of the water flowing through the venture nozzle of the venturi pump. According to the principle shown in JP11-211314 the air from the vacuum cooling chamber is received in a water flow and transported away. No vapor condensation is performed by this method. The power of the vacuum recirculation pump 8, which is needed for operating the venturi pump 1 has to be dimensioned for the entire air flow containing the vapor and has thus to be of a large size. In order to reduce the amount of vapor which has to be handled by the vacuum pump, vapor condensers are added to the vacuum conduits in U.S. Pat. No. 2,696,775. U.S. Pat. No. 2,696,775 shows a vacuum chamber for the cooling of foodstuff, which is combined with a baking oven. After conclusion of the baking process, the bakery product is evacuated. Thus, the vapor is evacuated through a conduit, enters a condenser and then a vacuum pump. The condenser is arranged between the vacuum chamber and the vacuum pump and does not form the bottom of the vacuum chamber, such that the vapor is not in contact with the water bath. The vacuum pump has to handle also the vapor flow, which is a disadvantage of this concept.

An example for a condensing heat exchanger arranged upstream of a venturi pump is shown in JP2001-221546. Such vapor condensation in the heat exchanger prevents that a portion of the vapor enters the vacuum pump connected downstream thereto. However, the vacuum pump has to cope with the entire non condensed vapor volume flow from the vacuum chamber.

Document WO 2012/082060 A1 describes a vacuum cooling plant for bakery products, which is humidified with low pressure vapor. The device comprises a vapor generator for generating vapor under a sub-atmospheric pressure. The vapor is substantially free from air, whereby the vacuum generator is arranged in connection with the vacuum chamber, such that the generated vapor enters the chamber without contemporaneous air supply.

Thus, in the prior art, nearly the entire water vapor is discharged into the environment by the vacuum pump. As a consequence, the throughput through the vacuum pump is increased up to 100 times with respect to the volume of the through-put of air. A portion of the water vapor can be used specifically to increase the humidity of the bakery products. This solution is subject to a high energy consumption. For this reason, a vacuum pump with high capacity has to be used. The power of the pump is usually about 45 kW. The use of such a high capacity vacuum pump has a number of disadvantages in operation next to the high energy consumption.

In the most cases the vacuum pumps for pumping the vapor volume are of the oil-lubricated type, due to the fact that they have a high electrical connection value. During the operation of the vacuum pump, the vapor, which has to be discharged from the vacuum chamber, comes into contact with the lubricant. If the vapor condenses before entering the vacuum pump or condenses in the interior of the vacuum pump, a water-oil mixture forms, which forms a stable emulsion. The lubricant has to be heated substantially above the boiling point of water to avoid forming of such an emulsion. The lubricant has a boiling point of above 100° C. The boiling point of the water lies below. The vacuum pump should therefore be operated above the boiling point of water. Thus, the entire vacuum pump parts which come into contact with the vapor should have a temperature with is above the boiling point of water. That means, the water vaporizes under atmospheric conditions. For this reason, the vacuum pump has to keep running also when it is not needed for generating a vacuum to generate the necessary heat. An oil emulsion can appear, if vapor is present in the vacuum chamber, even if the vacuum chamber is not anymore used for performing a vacuum cooling. Thus the vacuum pump should run at least for a further hour after the last vacuum cooling process has been completed. The vacuum pump should be started at least an hour, advantageously 90 minutes, before performing a vacuum cooling process to obtain the necessary operating temperature.

A separator can be arranged downstream of the vacuum pump to condense the water vapor. If water vapor condenses already in the vacuum pump, this water vapor is enriched with lubricant. For this reason, sticky lubricant residues remain in the water vapor condensate, which can reach the water discharge. Due to the fact, that the oil emulsion which is formed by the condensing water vapor in the vacuum pump is stable, it is under certain circumstances not possible to separate it by a conventional oil filter. The separators to be used are bulky, difficult to dewater and to clean.

The use of a powerful vacuum pump can also lead to a phenomenon, in which contaminants, such as dirt particles, fats resulting from the foodstuff or other baking residues are evacuated from the vacuum chamber. Filters can be built in the vacuum conduit between the vacuum chamber and the vacuum pump to prevent that such contaminants from reaching the vacuum pump. However, each filter in the vacuum conduit increases the pressure drop, which is to be considered as of negligible influence in a pressure region of 200 to 300 mbar however, for pressure below 20 mbar, in particular below 5 mbar and below, a substantial increase of the pump capacity is required to obtain an evacuation in these lower vacuum ranges.

The condensate of the vapor evacuated from the vacuum chamber is rather acidic and any machine parts of the vacuum pump made of steel can corrode, if they come into contact with the condensate. Vacuum pump parts as well as filters or separators made of steel can corrode, if they come into contact with the condensate. It is possible to use vacuum pump parts as well as filters or separators made of stainless steel. However, it was shown, that also parts made of stainless steel can corrode if condensate accumulates in a dead space. In order to keep the oil temperature all the time above the boiling point of the water, the vacuum pump has to be switched on all the time. Thus an additional energy consumption is required because the vacuum pump remains switched on, even if it is not needed for the vacuum cooling process.

For this reason, a vapor condenser as well as a vacuum cooling device with a vapor condenser has been proposed in EP 2832241 A1, which allows to condense a large portion of the vapor produced in the product chamber of the vacuum chamber to avoid any contamination of the vacuum pump, such that the power requirement of the vacuum pump can be reduced.

However, it has been shown that the direct supply of the vapor containing discharge air from the product chamber into the cooling agent for some products may result in the supply of solids to the cooling agent, which are retained in the cooling agent. This in principle desirable effect leads to the supply of an air flow deprived from the vapor to the vacuum pump, however at the disadvantage that the cooling agent is contaminated by the solids. Therefore, it is desirable for hygiene purposes to remove the cooling agent containing the solids from the vapor condenser and/or to clean the cooling agent.

An object of the invention is to develop a vacuum cooling device and a method for the vacuum cooling of a foodstuff, such that a cooling agent containing a condensate can be discharged from a vapor condenser to supply the cooling agent to a waste disposal device or to clean or recycle the cooling agent.

The object is solved by a vacuum cooling device according to claim 1. Further advantageous embodiments are subject of the dependent claims 2 to 5. A method for solving the problem underlying the invention is subject of claims 6 to 10.

It is noted that the term "exemplary" is used herein to refer to examples of embodiments and/or implementations, and is not meant to necessarily convey a more desirable application of the teaching of the invention. Similarly, the terms "preferable" and "preferably" are used herein to refer to an example out of an assortment of contemplated embodiments and/or implementations, and is not meant to necessarily convey a more desirable application of the teaching of the invention. Therefore, it is understood from the above that "exemplary" and "preferable" or "preferably" may be applied herein to a plurality of embodiments and/or implementations. The subsequent detailed description contains a number of embodiments for the vacuum cooling device and the method according to the invention. In the description and the claims, the terms "comprise", "contain" or "are provided with" are to be interpreted as "contain, but are not limited to . . . ".

A vacuum cooling device for the cooling of foodstuff, in particular hot bakery products comprises a vacuum chamber, a product chamber for receiving the foodstuff for its cooling and a container. Furthermore, the vacuum cooling device comprises a vacuum source, e.g. a vacuum pump, which is connected to the separation chamber and a vapor condenser for condensation of vapor generated during the cooling process in the product chamber. The vapor condenser is arranged below the product chamber. The vapor condenser can contain a cooling medium, if the vacuum cooling device is in the operating state.

The vapor condenser comprises a cooling medium distribution device to distribute the cooling medium in the vapor condenser, whereby the product chamber comprises at least an opening for supplying the vapor containing discharge air into the cooling medium. The vapor containing discharge air is not in direct contact with the cooling medium in the vapor condenser, such that a mass exchange between the cooling medium and the vapor containing discharge air can occur. As a consequence of the mass transfer, at least a portion of the vapor of the vapor containing discharge air condenses in the cooling medium, such that a condensate containing cooling medium is obtained.

According to an embodiment, at least 75% in volume of the vapor condenses in the cooling medium. The vapor condenser can comprise a spraying device to introduce the vapor into the cooling medium. In particular, the cooling medium distribution device can be configured as a spraying device.

By using a spraying device, the mass transfer area can be further increased, such that in particular a higher portion of vapor migrates into the cooling medium. In particular, at least 80% in volume of the vapor can be condensed in the cooling medium.

According to an embodiment, the container can be in connection with the vapor condenser by a fluid conducting connection element. The fluid conducting connection element can comprise a basin, a discharge stub, a cooling medium discharge conduit and a cooling medium discharge valve or is configured as connecting conduit, which comprises a cooling medium discharge valve.

According to an embodiment, the cooling medium can accumulate temporarily in the sump of the vapor condenser in the basin and can be discharged by means of the discharge stub continuously or periodically.

According to an embodiment the container contains a separation chamber or is configured as a separation chamber.

According to an embodiment, the separation chamber is arranged downstream of the vapor condenser, whereby the separation chamber receives the discharge air with low vapor content from the vapor condenser. According to an embodiment, the separation chamber is arranged next to a side wall of the product chamber. According to an embodiment, the separation chamber is arranged downstream of the container in a vacuum conduit leading to the vacuum source.

In particular, the vapor condenser can form an integral part of the vacuum chamber. In particular the vapor condenser can be configured as a filtering path for retaining contaminants in the vapor. This arrangement has the advantage, that the contaminants are enriched in the vapor. This arrangement has the advantage, that the contaminants concentrate in the vapor and the contaminants are retained in the cooling medium after the introduction of the vapor in the cooling medium. The vapor condenser contains according to an embodiment a basin, which comprises an intermediate space and a suction space, whereby the intermediate space is bounded on the upper side by a chamber floor. The chamber floor receives the supporting structures for the foodstuff in particular shelves, containers, chariots and others. The chamber floor contains at least one opening. Vapor containing discharge air can enter in the operating stage by this opening into the intermediate space of the vapor condenser from the product chamber. The operating pressure in the basin is lower than ambient pressure. The intermediate space is bounded by the chamber floor on the upper side and by an intermediate floor on the lower side. The intermediate floor can comprise according to an embodiment a plurality of openings or flow disturbing elements, which partially enter the cooling medium or are arranged above the liquid level of the cooling medium, such that a cooling medium can flow along the intermediate floor.

The intermediate floor can be seen as a separation element, which separates the intermediate space from the suction space extending thereunder. The suction space is connectable to the vacuum source, such that the vapor from the vapor space is receivable in the cooling medium by means of the vapor introduction element, if a sub-atmospheric pressure is generated in the suction space by the vacuum source. An air stream with low vapor content leaves the suction space in the direction of the separation chamber, which is connectable to the vacuum source.

The vacuum source comprises according to an embodiment a vacuum pump, whereby the vacuum pump is in particular a vacuum pump with controlled rotary speed. By adapting the rotary speed of the vacuum pump, the pressure curve can be controlled accurately. Thereby any type of pressure curve can be realized by adapting the rotary speed of the vacuum pump accordingly. The progress of the cooling method can influence the quality of the vacuum-cooled foodstuff. The progress of the cooling method is determined and monitored in particular by a control of the pressure in the vacuum chamber as well as an optional control of the temperature.

According to an embodiment, a control unit for the amount of cooling medium and/or the cooling medium temperature can be foreseen. In particular, the amount of cooling medium can be an amount of condensed water. In particular, the cooling medium temperature can be a condensed water temperature. According to an embodiment, a control unit for the amount of condensed water and/or the condensed water temperature can be provided.

A method for the vacuum cooling of a foodstuff comprises the steps: filling a product chamber of a vacuum cooling device with the foodstuff, closing the product chamber, operating a vacuum source for generating a negative pressure. In the product chamber a vapor containing discharge air is generated by cooling of the foodstuff which is introduced in a vapor condenser. The vapor condenser is fluidly connected to the product chamber. The product chamber comprises at least an opening for the introduction of the vapor containing discharge air into a cooling medium, whereby the cooling medium is distributed by a cooling medium distribution device into the vapor condenser, such that a portion of the vapor is condensed in the cooling medium, such that cooling medium containing a condensate is obtained.

The cooling medium is in particular sprayed by the cooling medium distribution device into the vapor condenser, whereby the vapor containing discharge air is introduced into the sprayed cooling medium. That means, the cooling medium is sprayed into the inner space of the vapor condenser, where it comes into contact with the vapor containing discharge air. The condensation of the vapor containing discharge air is favored by the cooling effect. The portion of condensed vapor in the cooling medium comprises at least 75% in volume of the vapor contained in the vapor containing discharge air. After completion of the vacuum cooling, the product chamber is aerated and the pressure in the product chamber increases again. The discharge of the cooled foodstuff can be initiated as soon as the internal pressure in the product chamber substantially corresponds to the ambient pressure. In particular, the product chamber can comprise a chamber floor which contains an opening through which the vapor containing discharge air enters the vapor condenser.

According to an embodiment, the cooling medium charged with condensate can be exchanged periodically or after reaching a predetermined threshold value, in particular if its temperature rises too high, the concentration of contaminants reaches a maximum value or the pH value is reduced to 4 or less. Therefore, contaminants can accumulate in the container and can be discharged with the cooling medium or can be supplied subsequently to a waste treatment plant. The cooling medium containing the condensate can be received in a container, whereby the container comprises a valve to discharge the cooling medium containing the condensate from the container, whereby the valve is closed after the container has been drained. After completion of the draining of the container a valve can be opened which opens a connection conduit to the vacuum source, such that the container can be evacuated before being refilled during a subsequent vacuum cooling process. According to an embodiment, the cooling of the cooling medium can be performed by a heat exchanger, which is for instance supplied with fresh water.

According to an embodiment, the cooling medium containing the condensate is discharged continuously or periodically. A connection conduit is provided, which connects the lowest point of the basin of the vapor condenser with a container. This container is configured as a closed container, which can not have a wall in common with the vacuum chamber. A cooling medium discharge valve is arranged in the connection conduit. A cooling medium supply valve opens and closes the supply to the container. The container is provided according to an embodiment with an aeration conduit, which can be closed by an aeration valve. Furthermore, the container is provided according to an embodiment with a vacuum conduit, which can be closed by a valve. The container is provided with a cooling medium discharge conduit according to this embodiment. This cooling medium discharge conduit can be closed by a valve.

A bypass connection conduit can extend between the vacuum chamber and the vacuum source or the vacuum conduit leading to the vacuum source, which can be opened or closed by a bypass valve. If the bypass valve is opened, the vapor containing discharge air is not directed into the vacuum condenser but fed directly into the vacuum conduit.

This bypass connection can be opened at the end of the vacuum cooling process, in case the discharge air contains only a small portion of vapor. Due to the fact, that the pressure drop is smaller if the discharge air is directed from the vacuum chamber directly into the vacuum conduit, lower pressures can be obtained in the vacuum chamber.

The cooling medium is used advantageously as a filter path to deposit contaminants entrained with the vapor containing discharge air from the product chamber into the cooling medium by condensation. Thereby contaminants can be collected in a simple manner and it can be guaranteed that they do not enter the vacuum pump. For this reason, dry running vapor pumps can be used, as the air of low vapor content, which is sucked in from the separation chamber, contains only a low amount of water vapor and no more contaminants.

The acidic condensate of the vapor containing discharge air is diluted, as water is added to the cooling medium in the vapor condenser. Thereby the danger of corrosion damages on parts, which are in contact with the condensate, is reduced.

The progress of the vacuum cooling can be stored in an electronic control unit as a pressure curve dependent on the cooling time and can be accessed for a plurality of times. It is possible to obtain lots with the same product characteristics and thus more reproducible product characteristics by means of a precise control of the vacuum pump. The vacuum pump has to be switched on only for the duration of the vacuum process, thus the duration of the cooling in the operation under load, such that it operates in an energy efficient manner. Any foodstuff can be cooled by a rate controlled vacuum pump, that means, any arbitrary course of vacuum cooling can be realized, in particular no additional humidification of the foodstuff is required. The vacuum pump doesn't need to be switched off, it can run in standby mode. No work is done by the vacuum pump in standby mode.

In the following, embodiments of the invention are explained in connection with the drawings. Thereby it is shown in:

FIG. 1 a sectional view through a vacuum cooling device according to a first embodiment, FIG. 2 a sectional view through a vacuum cooling device according to a second embodiment, FIG. 3 a sectional view through a vacuum cooling device according to a third embodiment, FIG. 4 a sectional view through a vacuum cooling device according to any of the preceding embodiments in a view from below, FIG. 5 a detail of an intermediate floor according to the embodiment of FIG. 4, FIG. 6 a detail of a chamber floor according to the embodiment of FIG. 4, FIG. 7 the vapor condenser of the vacuum chamber according to the embodiment of FIG. 4 in a sectional view, FIG. 8 a detail of an arrangement for the reception of a cooling medium containing the condensate according to the embodiment of FIG. 4, FIG. 9 a detail of the arrangement of FIG. 8 from the rear side.

The vacuum cooling device 1 of FIG. 1 comprises a vacuum chamber 2, a vacuum source 3 and a vapor condenser 4. The vacuum source 3 is a vacuum pump, which is fluidly connected by a vacuum conduit 6 to the vacuum chamber 2. A valve 5 is arranged in the vacuum conduit 6 supplying the vacuum pump. The vacuum chamber 2 comprises a product chamber 7, which contains the foodstuff to be cooled in the operating state. Furthermore, the vacuum cooling device 1 contains a separation chamber 28. The separation chamber 28 is arranged next to the product chamber 7 and is separated from the product chamber by an intermediate wall 27.

The vacuum chamber 2 is bounded by a wall 22, a wall 21, a ceiling 23 as well as a floor 24. The front wall 26 is removed in this graphic representation to provide a view into the interior of the vacuum chamber 2. A rear wall 25 connects to the ceiling, the walls 21, 22 as well as the floor 24.

The vacuum chamber 2 can contain a door in the region of the wall 21 or the wall 26 or the wall 25 which is not shown and which is opened to place the foodstuff in the product chamber 7 and to extract it after the completion of the vacuum cooling from the product chamber 7. The product chamber 7 can be vented by means of an aeration valve 18, which is arranged above the ceiling 23. The aeration valve 18 is connected by an aeration conduit 9 to the product chamber 7. A filter element 19 is arranged in the aeration conduit to filter contaminants from the fresh air which could impair the quality of the foodstuff. The aeration valve 18 can be configured as a variable throttle element. In can be opened at least partially during the cooling process. During the charge and discharge of the foodstuff, the aeration valve 18 remains in an open state, such that a sufficient fresh air supply is guaranteed for persons who are in the product chamber, even if the door or the doors of the vacuum chamber 2 is/are closed. As moisture enters the product chamber 7 together with the fresh air, the fresh air is deflected inside the product chamber by a deflection element 38 in the direction of at least one of the walls 21, 25, 26, 27. The wall 26 is not visible in FIG. 1 due to the fact that it extends in front of the plane of the drawing and the wall 25 forms the rear boundary of the product chamber 7.

During the cooling process the droplets condense on the surface of the deflection element 38 or on one of the walls 21, 25, 26, 27. The deflection element 38 can be equipped with drain channels or it ends on the lowest point in a position, in which the condensate drops directly to the floor of the chamber. By these measures it can be avoided that the condensate comes into direct contact with the foodstuff.

The vacuum chamber 2 contains the vapor condenser 4, which forms the bottom part of the product chamber 7. The vapor condenser 4 is separated from the product chamber 7 by an intermediate floor 8. A chamber floor 30 is arranged above the intermediate floor 8. The foodstuff is placed on the chamber floor 30 by means of skids. The chamber floor 30 is used as support for a chariot, which carries the skids which form the support surfaces for the foodstuff. The floor 24 is arranged below the intermediate floor 8. The floor 24 contains a basin 11. The fluid flow proceeds the manner of a cooling medium film over the intermediate floor 8. This fluid flow is generated by cooling medium which reaches the interior space of the vapor condenser 4 by the cooling medium inlet stub 54.

A cooling medium supply conduit 12 enters the space between the chamber floor 30 and the intermediate floor 8. The cooling medium supply conduit 12 feeds into the intermediate space 80. The intermediate space 80 extends substantially between the chamber floor 30 and the intermediate floor 8. The cooling medium inlet stub 54 forms the outlet end of the cooling medium supply conduit 12, which contains a cooling medium distribution device 56. A cooling medium valve 14 is arranged in the cooling medium supply conduit 12. The cooling medium is obtained from a cooling medium reservoir 60. The cooling medium reservoir can be configured as a water container or a cold water supply. Optionally, a pump can be provided to supply the cooling medium to the vacuum chamber which is not shown due to the fact that it is not required in all of the embodiments of vacuum cooling devices 1.

The intermediate floor 8 is used as a mass transfer surface. The discharge air enters the cooling medium stream and the vapor is extracted from the air by condensation. At the same time a heat transfer between the vapor and the cooling medium occurs. The discharge air is to be understood as a water vapor/air mixture, which is extracted from the product chamber 7 if a vacuum is applied to the product chamber 7 by operating the vacuum source 3 to evacuate the product chamber 7 through the vacuum conduit 6. The cooling medium and the vapor are in direct contact, as the vapor is transferred onto the surface of the cooling medium stream from the opening or the openings 31. The vapor flows through the opening or the openings 31 and the basin 11. As soon as the vapor comes in contact with the cooling medium, in particular water, the water vapor portion condenses. Any contaminants present in the vapor remain in the cooling medium, which is enriched by the contaminants. The cooling medium therefore forms a filtering path for the vapor and a cooling medium containing the condensate is obtained. The air with low vapor content enters the separation chamber 28. The cooling medium containing the condensate can leave the basin 11 via a discharge stub 55. Mostly, water is used as a cooling medium.

The cooling medium and the discharge air are in direct contact in the vapor condenser 4 as at least an opening 31 is provided in the chamber floor 30, which is shown in FIG. 1 in a sectional view. The discharge air flows through the opening 31 and reaches the upper side of the intermediate floor 8. The discharge air comes into contact with the cooling medium in the intermediate space 80 between the chamber floor 30 and the intermediate floor 8, whereby the cooling medium enters the intermediate space by the inlet stub 54. The inlet stub 54 contains the cooling medium distribution device 56, for instance a spraying device, which can be configured in particular as a nozzle. As soon as the discharge air comes into contact with the cooling medium the vapor portion of the discharge air condenses in the cooling medium. The vapor is in this embodiment substantially water vapor, which can contain contaminants, which are resulting from the foodstuff. These contaminants can comprise solids and/or liquids, such as for instance fats or oils. Any contaminants in the discharge air accumulate in the vapor and remain in the cooling medium after the condensation of the vapor, which is consequently enriched by the condensed vapor and the contaminants. In the subsequent text, the cooling medium stream is referred to as a cooling medium containing condensate.

The cooling medium incorporating the condensate flows along the intermediate floor 8 as well as through openings 81 arranged in the intermediate floor 8 into the basin 11 arranged thereunder. The cooling medium incorporating the condensate flows in a cascade like manner through the openings 81 and over the edge 82 of the intermediate floor 8 into the basin 11. Thereby a splash layer is formed, which further increases mass transfer. Therefrom results that a large portion of the mass transfer already occurs by the time the cooling medium containing the condensate reaches the basin 11.

The intermediate floor 8 is according to this embodiment inclined by an inclination angle with respect to the horizontal plane to favor the discharge of the cooling medium containing the condensate. The cooling medium forms thereby a filtering path for the vapor, that means the vapor is condensed at least partially from the discharge air of the product chamber 7, such that an air stream of low vapor content leaves the vapor condenser 4, which is removed by the vacuum pump 3 from the vacuum chamber 2.

The air stream of low vapor content enters the separation chamber 28. The vapor contained in the discharge air from the product chamber 7 condenses on its way through the cooling medium to a condensate, which is received in the cooling medium and forms thereby a cooling medium containing the condensate. The cooling medium containing the condensate is collected in the basin 11 and is directed into the direction of the discharge stub 55. The basin comprises a basin bottom, which forms in this case the floor 24 of the vacuum chamber, which also is arranged in an angle of inclination with respect to the horizontal plane. The angle of inclination of the basin 11 can change in different sections of the basin. The discharge stub 55 is arranged at the lowermost point of the basin 11. A cooling medium discharge conduit 13 is attached to the discharge stub. The cooling medium containing the condensate is removed from the vacuum chamber 2 by the cooling medium discharge conduit 13.

The air stream of low vapor content is directed over a separation element 29, such that any residual vapor present in the air stream can enter the vacuum conduit 6. This separation element 29 can be a droplet separator comprising for instance a perforated sheet, a mesh or knit fabric, in which droplets are retained. A plurality of such separation elements 29 can be arranged in series and/or one above the other. The air stream with reduced vapor content enters the vacuum conduit 6 after its passage through the separation element 29 and is evacuated by the vacuum pump 3.

A cooling medium discharge valve 15 is arranged in the cooling medium discharge conduit 13. The cooling medium containing the condensate is guided by the cooling medium discharge conduit 13 into a container 10, in which the cooling medium containing the condensate is collected. Optionally, the container 10 can contain a separator for the separation of the contaminants.

The container 10 can comprise at least a valve 46 to discharge the cooling medium containing the condensate periodically or continuously. In addition, a closure device 16 can be provided, which can comprise a slide element, which closes an end of the container 10. In case the slide element is open, the container 10 can be cleaned easily. A pump 40 is attached to the container 10, such that the liquid from the interior of the container can be removed to aspirate the cooling medium containing the condensate from the basin 11. A valve 48 is arranged in the connection conduit leading from the container 10 to the pump 40. It has been shown that any cooling medium containing condensate remaining in the basin 11 is warmed up by the condensate, such that a cooling element has to be provided in the same manner as in the prior art. However, such a cooling element is difficult to clean and to maintain, therefore a solution with a cooling element in the basin 11 has been proven to be less advantageous.

As soon as the vacuum cooling process in the vacuum chamber is finished, the cooling medium valve 14 can be closed and the pump 40 can be switched off. An aeration valve 42 is opened for aeration, such that the pressure in the interior space of the container 10 can increase to ambient pressure. Subsequently, the valve 46 can be opened, the container 10 can be emptied and a cleaning of the container 10 can be performed.

If a vacuum cooling method is to be performed in the vacuum cooling device 1, the product chamber 7 is charged with the product to be cooled. All method steps can be controlled by a control unit 50. The control conduits are represented in FIG. 1 by dotted lines. After having charged the vacuum chamber 7 with the product, all doors 20 leading to the product chamber 7 are closed. The aeration valve 18 is closed, the valve 5 in the vacuum conduit 6 is opened and the vacuum pump 3 is put into operation. The cooling medium valve 14 is opened to supply the cooling medium to the cooling medium distribution device 56. The aeration valve 42 of the container 10 as well as the closure device 16 are closed, the valve 48 is opened and the pump 40 is put into operation. When the container pressure corresponds substantially to the pressure in the vacuum chamber, the cooling medium discharge valve 15 is opened. The cooling medium can pass at this stage from the cooling medium reservoir 60 via the cooling medium supply conduit 12 into the vacuum chamber, can take up the condensate from the discharge air and can cool the discharge air thereby as well as cause a temperature decrease in the product chamber 7. The cooling medium can be configured at least partially as a spray mist in the vapor condenser 4, if the cooling medium distribution device 56 causes a vaporization of the cooling medium into droplets or inserts are provided in the intermediate space 80, which can cause the generation of a cooling medium spray mist or support it. The larger the mass transfer surface of the cooling medium in the vapor condenser, the higher is the portion of vapor which can be condensed in the cooling medium. The cooling medium containing the condensate flows in the basin 11 in direction of the discharge stub 55 and leaves the vacuum chamber 2 through the discharge stub to enter the cooling medium discharge conduit 13. The cooling medium containing the condensate passes the cooling medium discharge valve 15 and enters the container 10, in which it accumulates.

The air stream of low vapor content leaves the vapor condenser via a passage bounded by the wall 22, the intermediate wall 27, the front wall 26 and the rear wall 25, which forms a separation chamber 28. The air stream of low vapor content can pass a separation element 29 in the separation chamber 28, such that any residual vapor in the air stream of low vapor content can be condensed and can be introduced into the basin 11. The air stream of low vapor content leaves the vacuum chamber 2 via the vacuum conduit 6, which leads to the vacuum pump 3. The vacuum pump 3 operates for the duration of the vacuum cooling. It is possible, that during some stages of the vacuum cooling process, the aeration valve 18 is opened to adapt the temperature and pressure curves in the product chamber 7 to the set temperature and pressure curves. The temperature and/or pressure in the product chamber 7 can be obtained by a measuring element 52. Upon termination of the vacuum cooling process, the aeration valve 18 is opened until the pressure in the product chamber 7 corresponds to the ambient pressure. The vacuum pump 3 is switched off and the valve 5 is closed. At the same time the cooling medium valve 14 is closed. The cooling medium discharge valve 15 is closed if not more cooling medium containing condensate is present in the basin 11 or the cooling medium discharge conduit 13. Then the pump 40 is switched off and the aeration valve 42 is opened. If the interior pressure in the container 10 corresponds to ambient pressure, the valve 46 can be opened to empty the container 10. As soon as the container 10 is emptied and optionally cleaned the valve 46 can be closed again. The vacuum cooling device 1 is not ready for a further vacuum cooling process.

Figure 2:
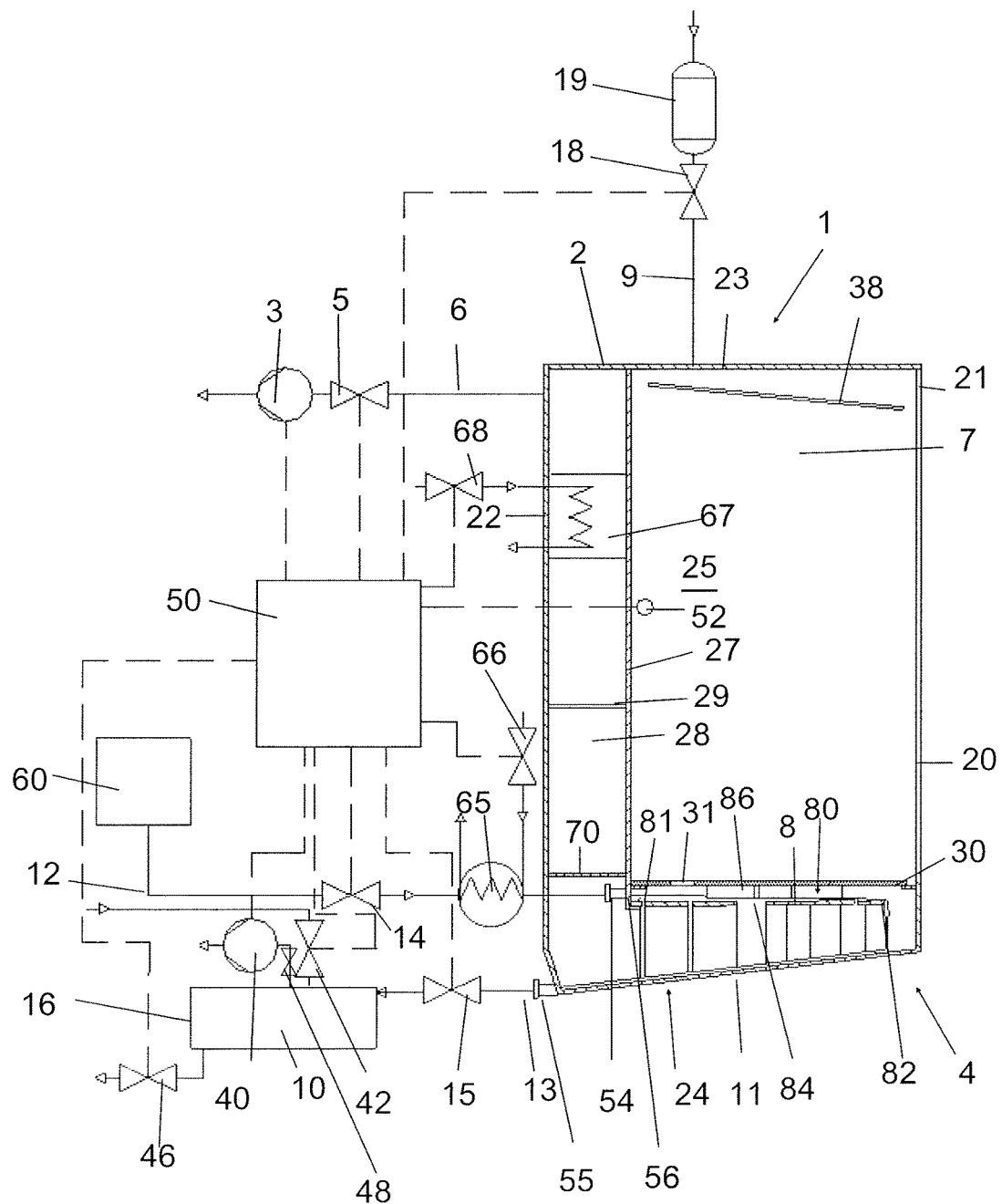

FIG. 2 shows a vacuum cooling device according to a second embodiment. Elements having the same configuration or a function which corresponds to the embodiment shown in FIG. 1 carry the same reference numbers as FIG. 1. The embodiment shown in FIG. 2 differs for instance from the first embodiment by the arrangement of a cooler 65 in the cooling medium supply conduit 12. The cooler 65 comprises a refrigerating medium supply conduit which is connected to a refrigerating medium source which is not shown. The refrigerating medium has a lower temperature than the cooling medium passing through the cooling medium supply conduit 12 when entering the cooler 65, such that the cooling medium can be precooled by the refrigerating medium. The refrigerating medium supply can be controlled by a valve 66. In particular, the refrigerating medium supply can be controlled dependent on the cooling medium temperature required in the vacuum chamber 2. Depending on the nature of the product to be cooled in the product chamber 7, the cooler 65 can be operated or in the same manner as shown in the embodiment according to FIG. 1, the cooling medium can be supplied directly from the cooling medium reservoir 60 into the vacuum chamber 2. Furthermore, an air cooler 67 is shown in FIG. 2 which is provided for the cooling of the air stream of low vapor content, which is directed to the vacuum pump 3. The air cooler 67 is arranged in the interior of the separation chamber 28 according to this embodiment, it could also be arranged in the vacuum conduit 6, thus externally to the vacuum chamber 2. The air cooler 67 can be operated by cooling medium from the cooling medium reservoir 60 or another refrigeration medium, for example the refrigeration medium used for the cooler 65, if a cooler 65 and also an air cooler 67 are provided. In particular the air cooler 67 can be provided to cause a condensation of the residual vapor by cooling of the air stream of low vapor content entering via the vacuum conduit 6 into the vacuum pump 3, such that the vapor load on the vacuum pump 3 can be further decreased. The advantage of arranging an air cooler 67 in the separation chamber 28 is the possibility to direct the condensate from the air cooler 67 also into the basin 11.

A tray 70 can be arranged between the inlet stub 54 and the separation element 29. The tray 70 can be used to capture cooling medium containing condensate which has been entrained with the air stream of low vapor content and redirect it into the basin 11. The tray can be configured as a perforated sheet.

Furthermore, a variant of the cooling medium distribution device 56 and the intermediate floor 8 is shown in FIG. 2. The intermediate floor 8 has no angle of inclination such that the intermediate floor 8 is arranged substantially horizontally according to this embodiment. The intermediate floor 8 comprises an opening 84, which has a longitudinal axis extending in the direction of fluid flow of the cooling medium stream or is arranged in an acute angle relative to the cooling medium stream. This opening 84 is configured as a slit-shaped opening. The intermediate floor 8 can comprise in the same way as in the embodiment according to FIG. 1 one or more openings 81, which extend transversely with respect to the direction of fluid flow of the cooling medium stream. The fluid flow of the cooling medium stream on the intermediate floor 8 and/or the spray mist in the intermediate space 80 is directed substantially from the cooling medium distribution device 56 to the edge 82 of the intermediate floor 8. The openings 81 or 84 can have an oval shape or can be configured as holes of circular cross-section.

Furthermore, a flow disturbing element 86 can be arranged on the intermediate floor 8 or on the lower side of the chamber floor 30.

Figure 3:
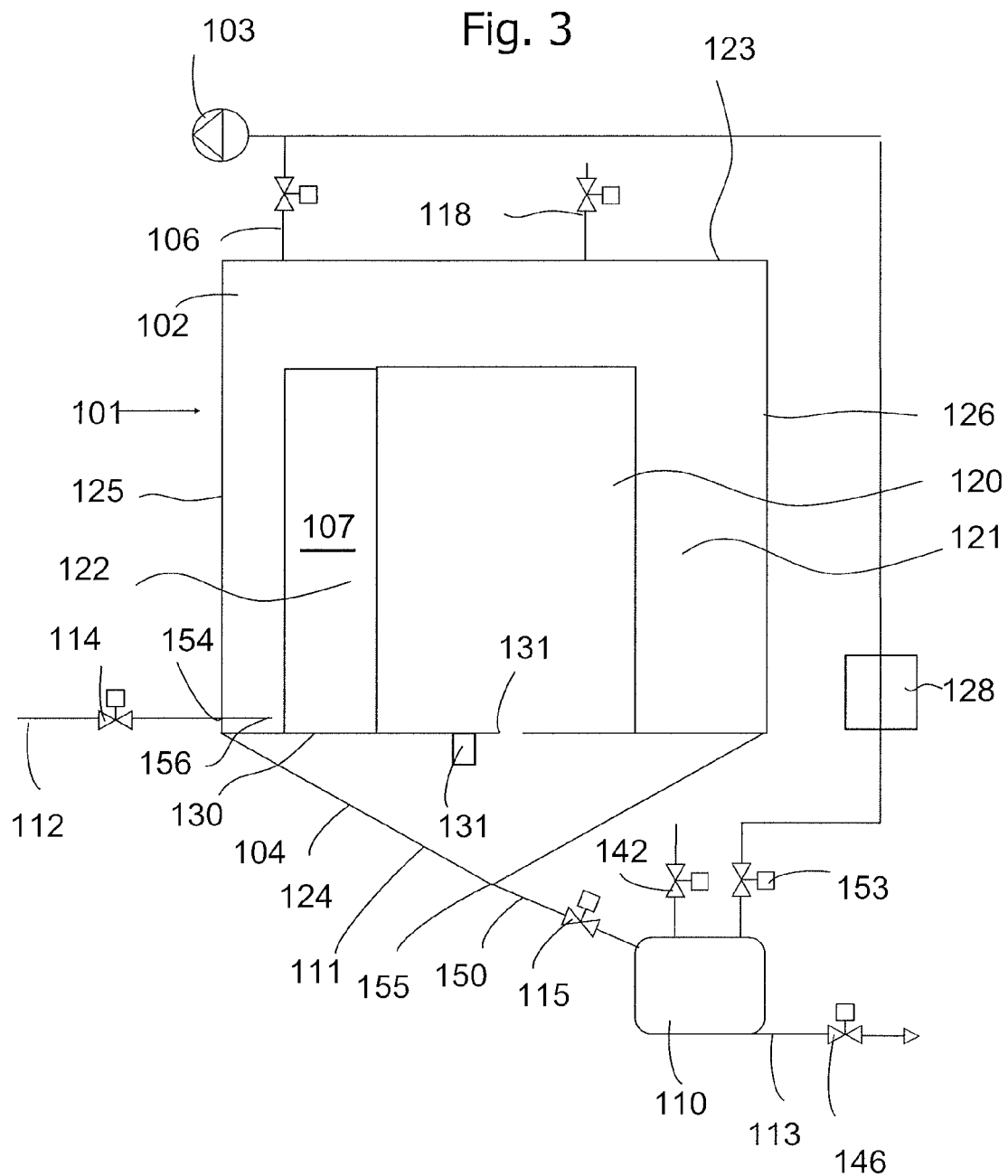

The vacuum cooling device 101 shown in FIG. 3 comprises a vacuum chamber 102, a vacuum source 103 and a vapor condenser 104. The vacuum source 103 is a vacuum pump, which is fluidly connected by a vacuum conduit 106 to the vacuum chamber 102. A valve 105 is arranged in the vacuum conduit 106. The vacuum chamber 102 comprises a product chamber 107, which contains the foodstuff to be cooled in the operating state. Furthermore, the vacuum cooling device 101 contains a container 110. The container 110 is arranged separately from the vacuum chamber 102 and connected thereto by a connection conduit 150. The container 110 comprises a conduit 113 containing a valve 146 to discharge the cooling medium containing the condensate from the container 110, whereby the valve 146 is closed after the container 110 has been emptied.

According to the embodiment of FIG. 3, the vacuum chamber 102 is bounded laterally by a wall 121, which contains a door 120, an opposite wall 122, a rear wall 125 and a front wall 126. The door 120 is according to this graphic representation shown as a sliding door which is partially open. The wall 122 is only partially shown through the door opening of the sliding door, also only a portion of the product chamber 107 is shown. The vacuum chamber has a floor 124 as well as a ceiling 123. A seal is arranged between the door 120 and the wall 121, the rear wall 125, the front wall 126 as well as the ceiling 123, such that the vacuum chamber has a gastight closure from the environment if the door 120 is closed. This seal can be for instance configured in the same manner as disclosed in EP 2881688 A1. The product chamber 107 has a chamber floor 130. The chamber floor 130 covers the entire floor surface of the product chamber 107. The chamber floor 130 comprises openings or recesses 131 used for directing the vapor generated in the product chamber during the vacuum cooling process to the vapor condenser 104. These openings 131 are shown in this graphic representation only schematically.

During the vacuum cooling process, the cooling medium, for instance fresh water, which can be tap water from the water supply system, is supplied to the vapor condenser 104 by the cooling medium supply conduit 112. A cooling medium distribution device 156 is arranged in the cooling medium inlet stub 154, which can generate a spray mist, which is used as a spray condenser and water filter in the bottom region of the vacuum chamber 102, such that the bottom region of the vacuum chamber 102 forms the vapor condenser 104. The bottom region of the vacuum chamber 102 is separated by a chamber floor 130 from the product chamber 107. The chamber floor 130 comprises at least an opening 131, through which a vapor containing discharge air in provenience from the product chamber 107 is directed to the vapor condenser 104. The cooling medium takes up vapor from the discharge air, whereby this vapor is condensed in the cooling medium. The cooling medium is distributed advantageously as a spray mist in the vapor condenser 104. The cooling medium distribution device 156 comprises advantageously at least a spraying device. The cooling medium containing the condensate deposits on the inner walls of the vapor condenser 104, which form a basin 111 formed by the floor 124. The cooling medium containing the condensate flows along the inclined floor 124 into a container 110, which is configured as a closed condensate container. The container 110 can be also configured as a separation container or can contain a separation container. A discharge stub 155 is arranged in the lowermost location of the floor 124 of the vapor condenser 104 or the vacuum chamber 102. A connecting conduit 150 is arranged downstream of the discharge stub 155. The connecting conduit 150 connects the vapor condenser 104 with the container 110, whereby a cooling medium discharge valve 115 is arranged in the connecting conduit.

The container 110 comprises an aeration valve 142, a valve 153 as well as a closure device 116. The condensate can leave the container 110 via the closure device 116, if the closure device 116 is open. During the vacuum cooling process, the cooling medium discharge valve 115 is open, the aeration valve 142 for the container 110 is closed. The valve 153 for evacuation of the container 110 is opened. The discharge air of low vapor content is removed from the container 110. A separation chamber 128 can be provided downstream of the valve 153. The container 110 is evacuated by the vacuum pump 103. When the vacuum cooling process is terminated, the cooling medium discharge valve 115 is closed and the aeration valve 118 is opened, such that the pressure in the product chamber 107 can rise again to ambient pressure. The door 120 to the product chamber 107 can be opened and the vacuum cooled product can be discharged from the product chamber 107.

The cooling medium discharge valve 115 is closed as soon as the container 110 is filled up completely at the end of one or more cycles of vacuum cooling processes. Then the vacuum pump 103 is switched off and at least the valve 153 is closed. If the aeration valve 142 is open, atmospheric pressure can be obtained in the container 110. Then the closure device 116 is opened to discharge the cooling medium containing the condensate. As soon as the container 110 is discharged, that means all cooling medium containing condensate is removed as well as any contaminants are removed by a cleaning process, the aeration valve 142 and the closure device 116 are closed. Solid contaminants can for instance be removed by a sieve element.

In case a further vacuum cooling process is to be performed, the cooling medium discharge valve 115 as well as the valve 153 for the evacuation of the container 110 are opened, whereby the valve 153 is connected directly to the vacuum pump 103. Thereby the pressure in the container 110 can be reduced to a pressure which corresponds to the internal pressure in the product chamber 107 taking into account any pressure drops by the chamber floor 130 or the connecting conduit 150. At latest at this point in time, the cooling medium discharge valve 115 can be opened and the cooling medium containing the condensate already present in the vapor condenser 104 can be directed into the container 110. A further advantage of this embodiment is that no separate vacuum pump is required for the container 110.

Figure 4:
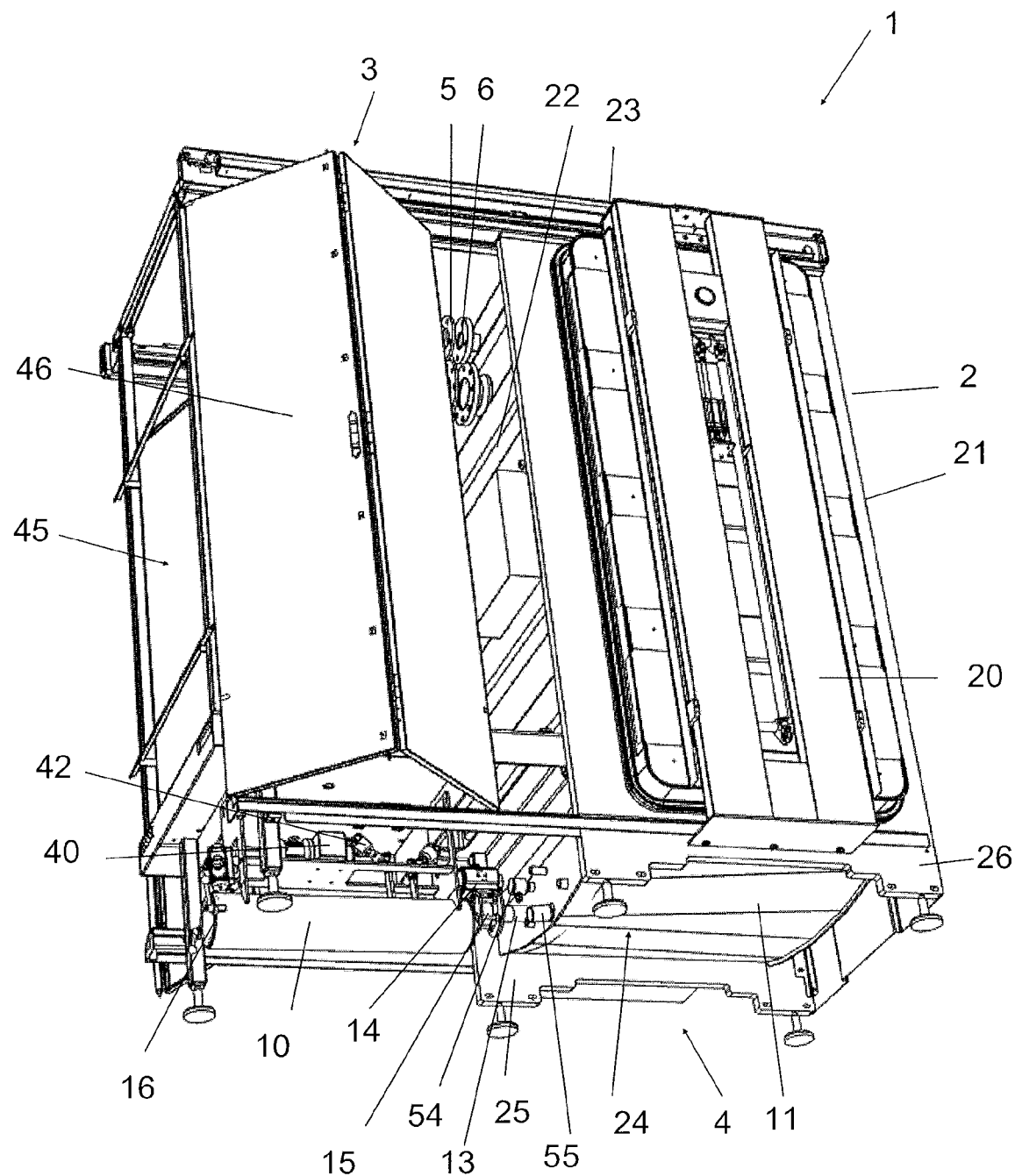

FIG. 4 shows a sectional view through a vacuum cooling device 1 according to any of the preceding embodiments in a view from below. The vacuum chamber 2 is closed by a door 20, such that the inner space of the vacuum chamber is not visible. A chamber 45 is arranged next to the vacuum chamber, which contains the vacuum pump 3, which is not visible in this graphic representation. The vacuum pump 3 can be configured for instance as a screw pump. The chamber 45 is closable by a door 46 according to this embodiment to protect the vacuum pump 3 from contaminants, to ensure personnel safety and noise protection. FIG. 4 also shows the underside of the basin 11, which forms the floor 24 of the vacuum chamber. The basin 11 has an angle of inclination which causes the cooling medium containing the condensate to flow towards the discharge stub 55. According to the graphic representation the basin 11 comprises a plurality of planar basin sections. The angle of inclination of the basin sections with respect to the horizontal plane increases in direction towards the front wall 26 or the rear wall 25.

Figure 5:
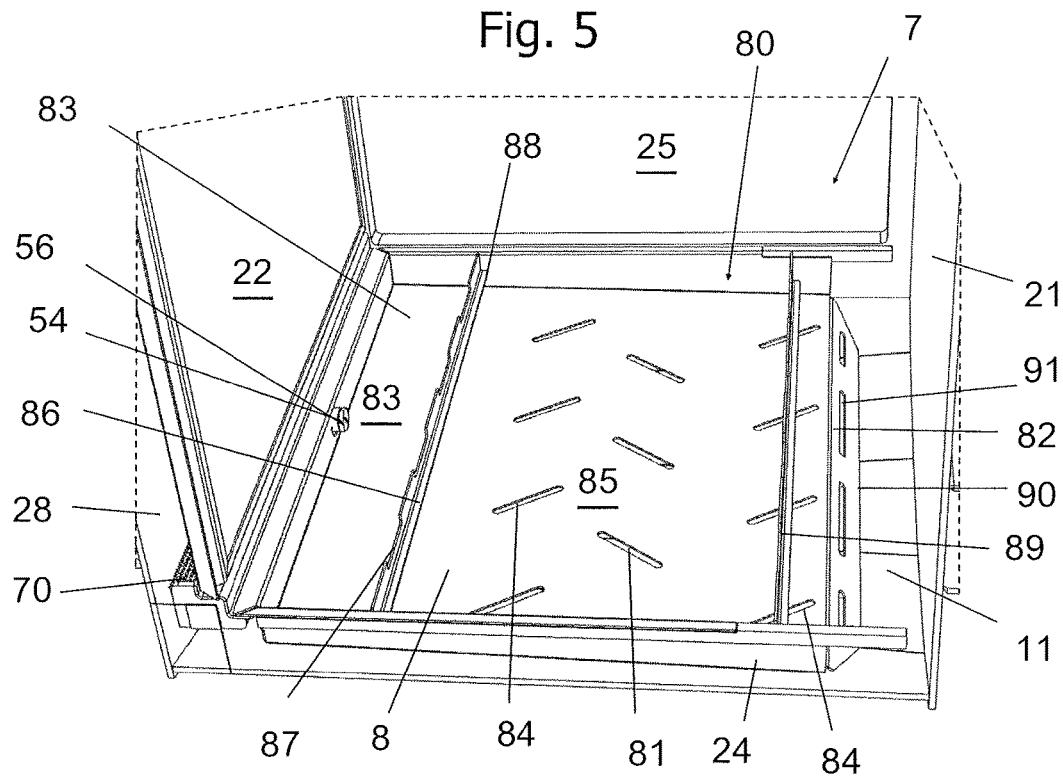

FIG. 5 shows a detail of an intermediate floor 8 according to the embodiment of FIG. 4. The chamber floor 30 is removed in FIG. 5 to allow for a view onto the intermediate floor 8. The cooling medium is supplied by the cooling medium inlet stub 54 containing a cooling medium distribution device 56 to the intermediate space 80 between the chamber floor 30 and the intermediate floor 8. The cooling medium is distributed over the entire surface of the intermediate floor 8 by the cooling medium distribution device 56. A first flow disturbing element 86 arranged transversely to the direction of flow of the cooling medium forms an obstruction configured as a weir for the cooling medium flow. The cooling medium is deflected by the flow disturbing element 86. The cooling medium flow can not only be deflected but also reversed in the intermediate floor section 83. Thereby the cooling medium comes into contact with the vapor containing discharge air. Already in the intermediate floor section 83, a substantial portion of the vapor of the discharge air can condense and forms the cooling medium containing a portion of the condensate. The cooling medium leaves the intermediate floor section 83 by recesses 87, which are arranged in the flow disturbing element 86.

According to this graphic representation the recesses 87 are configured as regions of lower height than the intermediate floor section 83. The lower edge 88 of the flow disturbing element 86 is substantially parallel to the surface of the intermediate floor 8. The lower edge 88 of the flow disturbing element 86 advantageously is arranged in a distance to the surface of the intermediate floor 8. A liquid film is formed on the surface of the intermediate floor 8, which consists of cooling medium containing the condensate. This liquid film should be able to flow freely over the surface of the intermediate floor 8 in direction of the second intermediate floor section 85. The second intermediate floor section 85 is delimited at the inlet end by the flow disturbing element 86 and at the outlet end by a further flow disturbing element 89. The upper edge surface of the flow disturbing element 89 is configured as a horizontal planar surface. The upper edge surface can continue from the lower side of the chamber floor 30. The chamber floor 30 can be placed on the upper edge surface of the flow disturbing element 89. Thereby the entire discharge air stream excluding any small portions passing through the openings 81, 84 is directed through the slit between the lower edge of the flow disturbing element 89 and the surface of the intermediate floor 8. Thereby the discharge air is brought into intensive contact with the cooling medium containing a portion of the condensate, whereby further vapor portions can condensate in the cooling medium. The cooling medium containing the condensate is directed downstream of the flow disturbing element 89 over a drainage element 90. The drainage element 90 continues from the downstream edge 82 of the intermediate floor 8 and is inclined in an angle with respect to the surface of the intermediate floor 8. The angle of inclination can advantageously be in a range of 60° up to and including 90°, such that a waterfall flow of the cooling medium containing the condensate into the basin 11 is formed. In addition, a major portion of the discharge air of low vapor content or the entire discharge air of low vapor content is directed over the drainage element 90.

The openings 81 differ from the openings 84 according to this embodiment by the angle, in which they are arranged with respect to the main direction of flow of the cooling medium. The angle of the opening 81 can in particular have the same nominal value as the angle of the opening 84, however the direction of orientation of the two angles is different, that means one of the angles is defined as an angle with a negative algebraic sign, the other angle is defined as an angle with a positive algebraic sign, i.e. one of the angles is measured in counterclockwise, the other angle in clockwise direction. The openings 81, 84 can have the same shape, however other shapes of the openings and/or other angular orientations of the openings could be provided according to other embodiments not represented in the drawings.

The drainage element 90 can comprise a plurality of openings 91. The openings 91 have the advantage, that the flow of the discharge air of low vapor content can be at least partially separated from the flow of the cooling medium containing the condensate.

Figure 6:
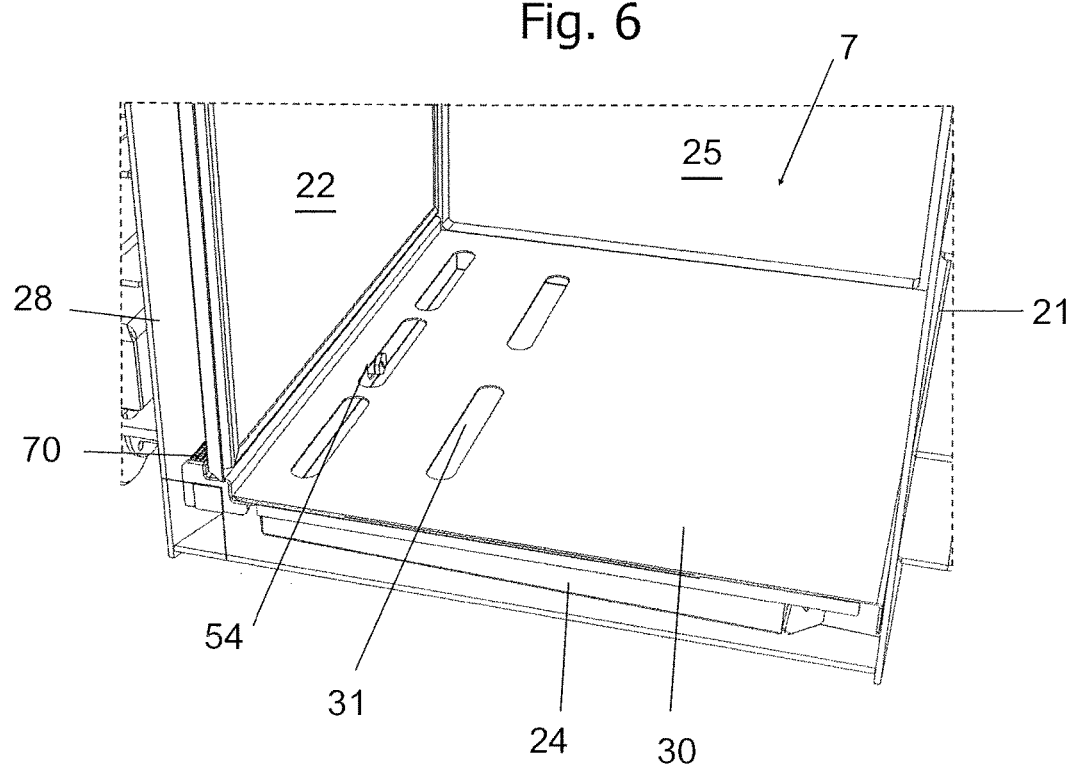

FIG. 6 shows a detail of a chamber floor 30 according to the embodiment of FIG. 4. The chamber floor 30 comprises a first row of openings 31 and a second row of openings 31. The vapor containing discharge air can enter through these openings into the intermediate space 80 between the chamber floor 30 and the intermediate floor 8. The first row of openings 31 arranged next to the wall can contain more openings 31 than the second row. The first row of openings 31 arranged next to the wall is in most cases not obstructed by chariots or other skids, such that the discharge air can reach the intermediate space 80 almost without hindrance.

Figure 7:
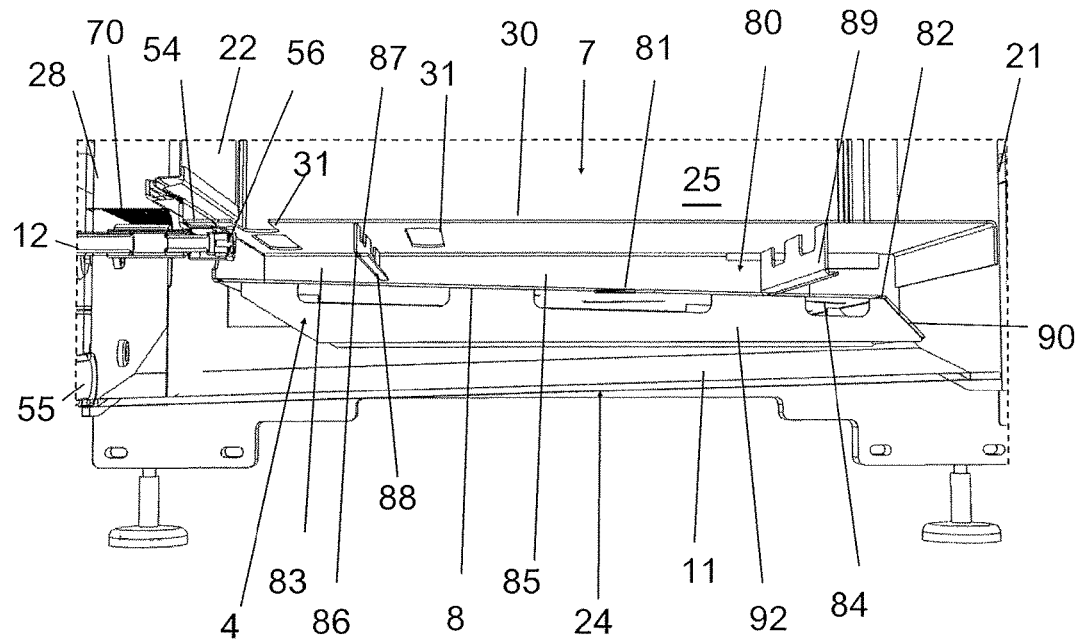

FIG. 7 shows the vapor condenser 4 of the vacuum chamber 2 according to the embodiment of FIG. 4 in a sectional view. The section extends parallel to the rear wall 25 substantially along a middle plane, such that the rear part of the vapor condenser 4 is visible. In particular, a section through the intermediate space 80 is shown in FIG. 7, which extends between the chamber floor 30 and the intermediate floor 8. The vapor containing discharge air comes into contact with the cooling medium in this intermediate space 80. The cooling medium flows from the cooling medium supply conduit 12 through the cooling medium inlet stub into the cooling medium distribution device 56. The cooling medium distribution device 56 distributes the cooling medium into the first intermediate floor section 83 as described earlier in connection with FIG. 6. In FIG. 7 it is also shown, that the flow disturbing element 86, which forms the boundary of the first intermediate floor section 83 at the discharge side, as well as the flow disturbing element 89, which forms the boundary of the second intermediate floor section 85 at the discharge side, are arranged at a distance with respect to the intermediate floor 8. Thereby it is ensured that the cooling medium, which is containing a portion of the condensate, can flow in the direction of the edge 82 freely. It is also shown in FIG. 7, that the intermediate floor 8 is reinforced on its underside by a plurality of bars 92. In FIG. 7 it is also shown that the intermediate floor 8 is inclined relative to the chamber floor 30 to support the discharge of the cooling medium containing a portion of the condensate. For this reason, the flow disturbing element 89 has a greater height than the flow disturbing element 86.

Each of the flow disturbing elements 86, 89 can comprise a deflection on its lower end, whereby a flow passage for the cooling medium containing a portion of the condensate is formed. The first intermediate floor section 83 and the second intermediate floor section 85 are fed with vapor containing discharge air by a plurality of openings 31, which are arranged in the chamber floor 30. The vapor containing discharge air flows in parallel to the cooling medium, such that the vapor is received by the cooling medium. If the cooling medium reaches the drainage element 90 it forms a cooling medium containing a portion of the condensate. This cooling medium containing a portion of the condensate is redirected by the wall 21 and flows below the intermediate floor 8 in the direction of the discharge stud 55, whereby the main direction of flow is substantially opposite to the main direction of flow on the intermediate floor. The discharge air as well as the cooling medium containing a portion of the condensate passes the openings 81 and 84 on the path through the basin 11. The cooling medium containing a portion of the condensate flows through these openings into the basin 11 and takes up further vapor from the discharge air such that a cooling medium containing a condensate is obtained. The discharge air of low vapor content leaves the vapor condenser 4 through the tray 70 and enters the separation chamber 28. The cooling medium containing the condensate leaves the basin 11 via the discharge stub 55.

Figure 8:
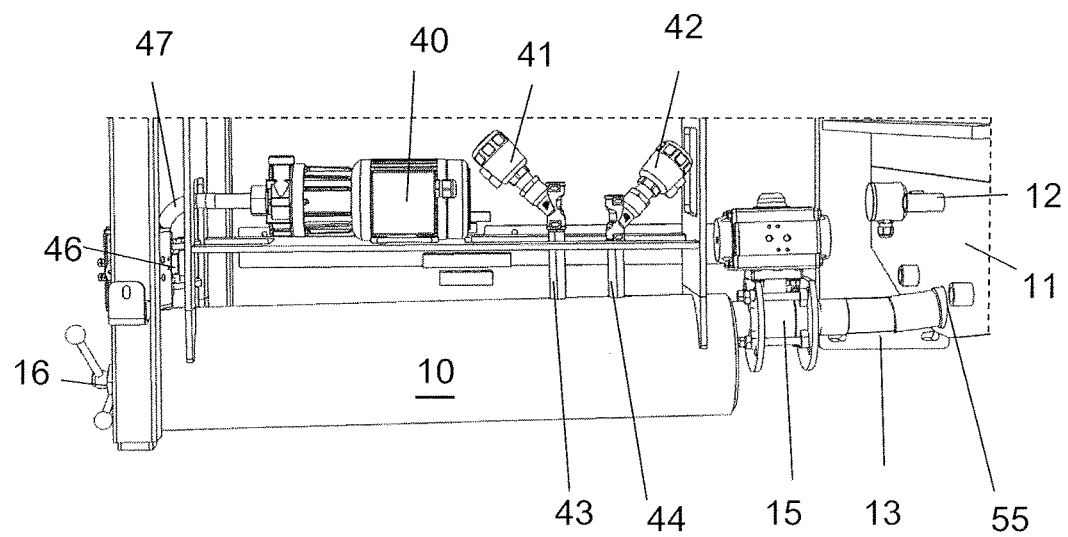

FIG. 8 shows a detail of an arrangement for the reception of a cooling medium containing the condensate according to the embodiment of FIG. 4. The cooling medium containing the condensate is fed from the discharge stub 55 into the cooling medium discharge conduit 13. A cooling medium discharge valve 15 is arranged in the cooling medium discharge conduit, which is opened during vacuum operation, such that the cooling medium containing the condensate can flow freely into the container 10. The cooling medium containing the condensate is collected in the container 10. Optionally, the container 10 can comprise a separation device to separate in particular solids from the cooling medium containing the condensate. Depending on the specific weight of such solids, a settling basin can be provided, in which the solids accumulate. Upon termination of the vacuum cooling process the cooling medium discharge valve 15 is closed, as soon as no more cooling medium containing the condensate flows through the cooling medium discharge conduit 13.

Subsequently, the interior space of the container 10 is brought to normal pressure by opening the aeration valve 42. Air flows into the container 10 via the aeration conduit 44. If the interior space of the container has a pressure corresponding to ambient pressure, valve 46 can be opened and the cooling medium containing the condensate can be discharged from the container 10. Optionally a separation device arranged in the container 10 can be removed through the discharge opening of the closure device 16 when open to dispose of the solids separately or to clean the container 10. The closure device 16 is used for closing the discharge opening of the container which has a size corresponding to the inner diameter of the container 10. Due to the size of the discharge opening the container can be cleaned entirely after having been emptied, such that any formation of germs in the container can be prevented.

Optionally a rinsing fluid can be supplied to the container 10 by a rinsing conduit 43. For this reason, a rinsing valve 41 can be provided, which opens if the container 10 has to be rinsed. The rinsing fluid can comprise in particular water from the cooling medium reservoir 60 as shown schematically in FIG. 1. The emptied and cleaned container 10 can be evacuated for the subsequent vacuum cooling process by a pump 40. The pump 40 is connected to the container 10 by the valve 46 and the fluid conduit 47. The valve 46 is normally closed except for emptying and/or cleaning the container 10. If the pressure in the interior space of the container 10 corresponds to the sub-atmospheric pressure present in the vacuum chamber 2, the cooling medium discharge valve 15 can be opened when the vacuum cooling process starts, such that the container 10 is ready again for receiving the cooling medium containing the condensate. According to a variant not shown in the drawings, the container 10 can also be emptied during a vacuum cooling process.

Figure 9:
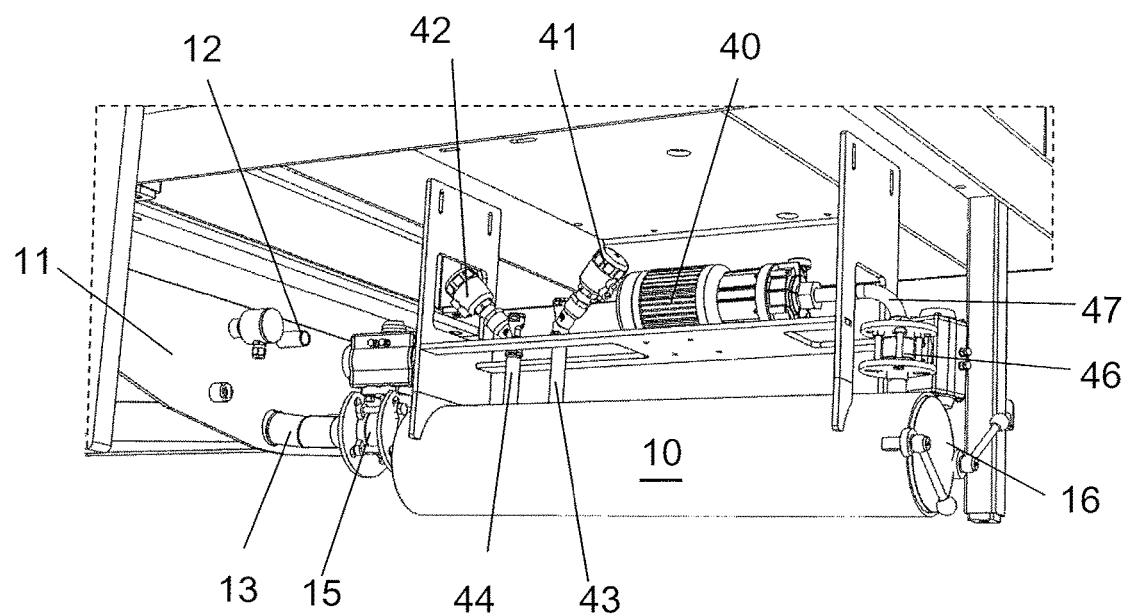

FIG. 9 shows a detail of the arrangement according to FIG. 8 from the rear side. In this graphic representation, the closure device 16, as well as the valve 46 and the fluid conduit 47 which leads to the pump 40 are more visible. Hg. 9 also shows the end of the cooling medium supply conduit 12 to the vapor condenser 4. The cooling medium supply conduit 12 as well as the connection to the cooling medium reservoir 60 are omitted in this graphic representation as well as in the preceding figures for the sake of clearness. The cooling medium supply conduit 12 can be for instance configured as a tube or a pressure hose. For the same reason, the further continuation of the aeration conduit 44 as well as the rinsing conduit 43 is omitted.

This process can be repeated at least three times for any of the preceding embodiments during the manufacture of a product before the container 10, 110 has to be emptied. That means, the container 10, 110 has a capacity for cooling medium containing condensate which corresponds to the average requirement of cooling medium and condensate of three working cycles. Under a working cycle it is to be understood the vacuum cooling process performed in the vacuum cooling device 1, 101 for manufacturing a product or group of products. Thereby the accumulation of cooling medium in the vacuum chamber 2, 102 can be prevented, such that a cooling of the condensate is not required in the vacuum chamber 2, 102. It has been practically shown, that a number of bakeries can't benefit from the thermal energy which is recycled into the system by a cooling of the condensate. Therefore, the generation of thermal energy, which can't be disposed of, can be avoided by not cooling the cooling medium containing the condensate in the vapor condenser whereby the cooling medium is warmed in the vapor condenser 4, 104 to a small extent as it receives the thermal energy of the condensing vapor. However, the temperature in the container 10, 110 rises only to a minimal extent, such that the cooling medium, optionally after separating the contaminants in the separation chamber, can be fed directly into the sewage water circuit. The heat exchanger required in the vapor condenser 4, 104 is therefore not required in any of the embodiments anymore.

In addition thereto or alternatively to the previous embodiments, a cooling element can be provided at the external side of the basin 11, 111, which is disposed with a cooling jacket or finned tube elements. Finned tube elements can be provided also in the interior space of the basin. The finned tube elements are advantageously arranged below the intermediate floor 8 and are protected by the intermediate floor 8 from damage. The intermediate floor 8 is only removed for assembly, for cleaning or for maintenance works.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of an element or compound selected from the group consisting of A, B, C . . . and N, the text should be interpreted as requiring only one element from the group, not A plus N, or B plus N or any other combination of two or more elements or components of this group.

The invention claimed is:

1. A vacuum cooling device for cooling of foodstuff, comprising:
   a vacuum chamber, which contains a product chamber for receiving the foodstuff for its cooling and a container,
   a vacuum source, which is connected with the product chamber or the container, and
   a vapor condenser for condensation of vapor containing discharge air generated during the cooling process in the product chamber, whereby the vapor condenser is arranged below the product chamber,
   whereby the vapor condenser contains a cooling medium, if the vacuum cooling device is in an operating state, and
   wherein the vapor condenser comprises a cooling medium distribution device to distribute the cooling medium in the vapor condenser, which vapor condenser is configured to condense the vapor of the vapor containing discharge air, and
   whereby the product chamber comprises at least an opening for supplying the vapor containing discharge air into the cooling medium.

2. The vacuum cooling device according to claim 1, whereby the cooling medium distribution device is configured as a spraying device.

3. The vacuum cooling device according to claim 2, whereby the container is in connection with the vapor condenser by a fluid conducting connection element.

4. The vacuum cooling device according to claim 3, whereby the fluid conducting connection element comprises a basin, a discharge stub, a cooling medium discharge conduit and a cooling medium discharge valve or is configured as a connecting conduit, which comprises a cooling medium discharge valve.

5. The vacuum cooling device according to claim 1, whereby the container contains a separation chamber or is configured as a separation chamber.

6. The vacuum cooling device according to claim 5, whereby the separation chamber is arranged downstream of the vapor condenser for receiving the discharge air with low vapor content.

7. The vacuum cooling device of claim 1 wherein the product chamber includes a door configured for receiving heated bakery products on a support structure.

8. The vacuum cooling device of claim 7 further comprising a skid support as the support structure for the heated bakery products.

9. A method for vacuum cooling of foodstuff, comprising the steps of supplying the product chamber of a vacuum cooling device with foodstuff, closing the product chamber, activating a vacuum source for generating a negative pressure, whereby a vapor containing discharge air is produced in the product chamber by means of the cooling of the foodstuff, whereby the vapor containing discharge air is introduced into a vapor condenser, whereby the vapor condenser is fluidly connected to the product chamber, and wherein the product chamber comprises at least one opening for introducing the vapor containing discharge air into the cooling medium, whereby the cooling medium is distributed by a cooling medium distribution device into the vapor condenser such that a portion of the vapor of the vapor containing discharge is condensed in the cooling medium, whereby a cooling medium containing a condensate is obtained.

10. The method according to claim 9, whereby the cooling medium is sprayed by the cooling medium distribution device into the vapor condenser, whereby the vapor containing discharge air is introduced into the sprayed cooling medium.

11. The method according to claim 9, whereby the portion of condensed vapor in the cooling medium comprises at least 75% in volume of the vapor contained in the vapor containing discharge air.

12. The method according to claim 9, whereby the cooling medium containing the condensate is received in a container, whereby the container comprises a valve to discharge the cooling medium containing the condensate from the container, whereby the valve is closed after the container has been emptied.

13. The method according to claim 9, whereby the product chamber comprises a chamber floor, which contains the opening, through which the vapor containing discharge air enters the vapor condenser.

14. The method of claim 9, wherein the vacuum cooling of foodstuff includes cooling of a heated bakery product.

* * * * *